(12) United States Patent
Goretti

(10) Patent No.: US 10,618,712 B2
(45) Date of Patent: Apr. 14, 2020

(54) CORRUGATED CARDBOARD PACKAGE ADAPTED TO DETECT BREAKS MADE TO ITS DETRIMENT

(71) Applicant: Assograph Italia S.r.l., Cesano Maderno (MB) (IT)

(72) Inventor: Franco Goretti, Cesano Maderno (IT)

(73) Assignee: ASSOGRAPH ITALIA S.R.L., Cesano Maderno (MB) (IT)

( * ) Notice: Subject to any disclaimer, the term of this patent is extended or adjusted under 35 U.S.C. 154(b) by 0 days.

(21) Appl. No.: 16/413,948

(22) Filed: May 16, 2019

(65) Prior Publication Data

US 2019/0352066 A1    Nov. 21, 2019

(30) Foreign Application Priority Data

May 16, 2018 (IT) .......................... 102018000005410

(51) Int. Cl.
*G08B 13/12* (2006.01)
*B65D 55/02* (2006.01)
(Continued)

(52) U.S. Cl.
CPC ......... *B65D 55/028* (2013.01); *B65D 5/4212* (2013.01); *B65D 27/14* (2013.01);
(Continued)

(58) Field of Classification Search
CPC .... B65D 55/028; B65D 5/4212; B65D 27/14; B65D 27/30; B65D 55/06;
(Continued)

(56) References Cited

U.S. PATENT DOCUMENTS 5,246,162 A  *  9/1993  Heuberger ............. B65D 5/062
                                                              229/117.31
7,301,460 B2     11/2007  Coste
(Continued)

FOREIGN PATENT DOCUMENTS

WO    WO 2004/037660      5/2004
WO    WO 2006/102883      10/2006
(Continued)

OTHER PUBLICATIONS

Italian Search Report, IT 201800005410, dated Feb. 12, 2019.

*Primary Examiner* — Munear T Akki
(74) *Attorney, Agent, or Firm* — Young & Thompson

(57) ABSTRACT

Disclosed is a package obtained by folding a sheet of conveniently cut and creased corrugated cardboard onto itself. The package includes multiple walls and wall linings which are at least partially opposed to one another. Certain wall linings are glued to the walls against which they are opposed in order to prevent the package from opening due to the cardboard sheet with which it is made being unfolded. An electrically conductive track is printed on the cardboard sheet at the inner face of the latter so that an opening of the package causes damage to the track. The package further includes an electronic device coupled to the conductive track and adapted to detect damage thereto, i.e. an alteration of one or more electric features of the track. Each of the wall linings glued to one or more walls of the package includes an easy tear-off-line intersecting the conductive track.

20 Claims, 3 Drawing Sheets

(51) Int. Cl.
*B65D 5/42* (2006.01)
*B65D 27/14* (2006.01)
*B65D 27/30* (2006.01)
*B65D 55/06* (2006.01)
*G06K 19/077* (2006.01)
*G08B 13/14* (2006.01)

(52) U.S. Cl.
CPC .............. *B65D 27/30* (2013.01); *B65D 55/06* (2013.01); *G06K 19/07798* (2013.01); *G08B 13/14* (2013.01); *B65D 2101/0092* (2013.01); *B65D 2203/10* (2013.01)

(58) Field of Classification Search
CPC ........ B65D 2101/0092; B65D 2203/10; G06K 19/07798; G08B 13/14
See application file for complete search history.

(56) References Cited

U.S. PATENT DOCUMENTS

| | | | |
|---|---|---|---|
| 2005/0184871 A1* | 8/2005 | Coste | B65D 5/4212 340/568.2 |
| 2005/0225445 A1* | 10/2005 | Petersen | B65D 5/42 340/568.2 |
| 2007/0152822 A1 | 7/2007 | Eren et al. | |
| 2012/0187003 A1* | 7/2012 | Stewart | B65D 5/4291 206/216 |
| 2014/0291188 A1 | 10/2014 | Maddox et al. | |
| 2019/0127112 A1* | 5/2019 | Gray | B65D 5/5405 |

FOREIGN PATENT DOCUMENTS

| | | |
|---|---|---|
| WO | WO 2012/099708 | 7/2012 |
| WO | WO 2017/090936 | 6/2017 |

\* cited by examiner

CORRUGATED CARDBOARD PACKAGE ADAPTED TO DETECT BREAKS MADE TO ITS DETRIMENT

FIELD OF APPLICATION OF THE INVENTION

The present invention relates to the field of the containment and/or covering structures adapted to detect, and possibly signal to third parties, the occurrence of certain events involving them.

Among the structures of the aforesaid type, those to which the present invention relates consist of packages adapted to detect damage (undergone by them) of such an entity as to allow the access to the space portion enclosed by the package.

Namely, the present invention relates to a preferably corrugated cardboard package adapted to carry out the aforesaid detections, but also including one or more easy tear-off lines conveniently positioned so that a voluntary opening of the package causes a tear-off thereof at one of the aforesaid lines.

Overview of the Prior Art

The corrugated cardboard containment structures adapted to detect, and possibly signal to third parties, an opening thereof have been known for some years. By way of example, packages of this type are described in Italian Patent Application no. MI2014A002273 and in PCT Patent Application published under no. WO 2017 090936 A1. The packages disclosed in the aforesaid patent applications are made of a corrugated cardboard sheet conveniently cut and creased on one of the two sides of which an electrically conductive track was printed. The latter comprises a first and a second end at which it is connected to two terminals, respectively, of an electronic device adapted to cause an electric current to circulate along the track. Namely, said device is adapted to detect deviations from predetermined values of certain electric features of the conductive track (for example, due to an interruption thereof). The conductive track extends over the whole face of the cardboard sheet so that an opening of the package causes damage of the track and accordingly, an alteration thereof which can be perceived by the aforesaid electronic device. When a similar alteration takes places, the device saves this information and transmits it (or makes it accessible) to third parties preferably by means of radiofrequency electromagnetic waves.

In light of the above, the above-described packages are adapted to detect, and possibly signal to third parties, a possible break or an attempt to break made to their detriment. To increase the probability that an opening of the package is detected by the aforesaid electronic device, easy tear-off lines were provided, intersecting the conductive track and positioned so that a voluntary opening of the package necessarily causes a tear-off thereof at one of the aforesaid lines. By way of example, a package of this type is described in U.S. Pat. No. 7,301,460. Said easy tear-off lines however consist of a "hatched" through cut, i.e. of a plurality of through holes interposed between intact stretches of the package. Due to this, the easy tear-off lines are like dotted lines which are highly visible at both the faces of the cardboard sheet of which the package is made. This apparently is a disadvantage because if an ill-intentioned person who intends opening the package is aware of the presence of a method for detecting breaks such as that described above, the person is in the condition to pay attention so as not to tear off the easy tear-off lines.

OBJECT OF THE INVENTION

It is the object of the present invention to overcome the aforesaid drawbacks by providing a package adapted to detect breaks made to its detriment in a manner which is more difficult to circumvent with respect to known packages of the same type.

SUMMARY OF THE INVENTION

The present invention relates to a package, comprising:
a substantially flat element (such as e.g. a sheet) made of corrugated cardboard and at least partially folded onto itself so as to give rise to a plurality of walls connected to one another by respective folds,
said walls delimiting a space portion enclosed therebetween,
first walls of said plurality being respectively and at least partially opposed, at a face thereof facing said space portion (i.e. at the inner face of said first walls), to second walls of said plurality, at a face thereof facing the exterior of said package (i.e. at the outer face of said second walls),
said corrugated cardboard comprising two skins (or "covers") between which a "core" including at least one corrugated sheet is interposed;
connection means between said first walls and said second walls to which said first walls are respectively and at least partially opposed,
the connection between said first and second walls preventing said substantially flat element from being unfolded;
an electrically conductive track connected to said substantially flat element at a face thereof facing said space portion (i.e. at the inner face of the substantially flat element),
said track extending over said walls so that an opening of said package causes damage (i.e. an at least partial interruption) of said track (and accordingly an alteration of the electric features thereof);
control means electrically coupled to said track and adapted to detect damage (i.e. an at least partial interruption) thereof (that is, an alteration of one or more electric features of said tract, for example by being adapted to detect a deviation from predetermined values of one or more of the aforesaid electric features),
said control means preferably being connected to said substantially flat element at the face thereof facing said space portion (i.e. at the inner face of the substantially flat element),
in which, according to the invention, for each pair comprising one of said first walls and one of said second walls connected to each other by said connection means:
said substantially flat element comprises at least one easy tear-off line provided at the face of said first wall facing said space portion (i.e. at the inner face of said first wall),
said easy tear-off line comprising cuts and/or holes extending into the thickness of said substantially flat element so as not to reach the cover corresponding to the face of said first wall facing the exterior of said package (i.e. corresponding to the outer face of said first wall), said easy tear-off line intersecting said track so that the tear-off of said line at an intersection with said track causes damage to the latter (and accordingly, an alteration of the electric features thereof), which can be detected by said control means, and said connection means comprising gluing means between at least one portion of the face of said first wall facing said space portion (i.e. of the inner face of said first wall), and one portion, opposed thereto, of the face of said second wall facing the exterior of said package (i.e. of the outer face of said second wall), the adhesion between said face portions of said first and second walls by said gluing means being such that the force to be applied to disconnect said first and second walls from each other thus overcoming said adhesion is greater than the force to be applied to disconnect said first and second walls from each other by tearing said first wall along said easy tear-off line so that part of said first wall remains adhered (i.e. glued) to said second wall to which it is at least partially opposed (that is, with an at least partial removal, from said first wall, due to said adhesion, at least of the cover corresponding to said inner face portion of said first wall, which remains glued to said second wall), said (inner) face portion of said first wall being at least partially close to said easy tear-off line, at least one stretch of said easy tear-off line not crossing said (inner) face portion of said first wall.

The package of the invention comprises a plurality of walls and wall linings which are at least partially opposed to one another. At least some of said wall linings (referred to as "first walls") are at least partially glued to the wall or to the walls against which they are opposed (referred to as "second walls") in order to prevent the package from opening due to the cardboard sheet with which it is made being unfolded (for an elastic return of said sheet).

The wall linings glued to the walls to which they are at least partially opposed are outer in the package of the invention and easy tear-off lines are made thereon. At least one of said wall linings is to be disconnected from the wall to which it is glued to access the space portion inside the package. Each time said disconnection (or an attempt to disconnect) takes place, at least one easy tear-off line tears, thus damaging (i.e. at least partially interrupting) the conductive track (because it is intersected by the easy tear-off lines) and necessarily altering the electric features thereof. Said alteration can be detected by the control means and accordingly can be communicated to third parties.

By comprising the easy tear-off lines, non-through holes and/or cuts (i.e. extending into the thickness of the cardboard sheet so as not to reach the outer cover), the easy tear-off lines advantageously are not visible from the exterior of the package. An ill-intentioned person who intends opening the package therefore cannot be aware of the presence of the easy tear-off lines. Additionally, even if said ill-intentioned person were aware of the presence of the easy tear-off lines, the person could not in any case be aware of the position of said lines.

Other innovative features of the present invention are disclosed in the following description and are referred to in the dependent claims.

According to one aspect of the invention, said portion (of the face) of said first wall connected to said portion (of the face) of said second wall by said gluing means, in one or more of said pairs of first and second walls, comprises a stretch of said track so that said gluing means also at least partially act as gluing means between said stretch of said track and said portion (of the face) of said second wall.

Advantageously according to this aspect of the invention, since the gluing means are at least partially directly applied on the conductive track, the probability is increased that an attempt to disconnect one of the aforesaid wall linings from the wall of the package to which it is glued causes an interruption of the track at said wall lining.

According to another aspect of the invention, said control means are connected to said substantially flat element at one of said first walls.

According to another aspect of the invention, said portion (of the face) of said first wall connected to said portion (of the face) of said second wall by said gluing means, in said pair of first and second walls comprising said first wall to which said control means are connected, comprises said control means so that said gluing means also at least partially act as gluing means between said control means and said portion (of the face) of said second wall.

Advantageously according to this aspect of the invention, since the gluing means are at least partially applied directly on the control means, a disconnection of the wall lining where the control means are applied causes an uncoupling of the latter from the conductive track.

Incidentally, the uncoupling of the control means from the conductive track is detected by the latter as damage (i.e. an at least partial interruption) of said track, that is as an alteration of one or more electric features thereof.

According to another aspect of the invention, said first wall to which said control means are connected comprises:
a free edge opposite to a fold at which said first wall is connected to a remaining portion of said substantially flat element;
at least one of said easy tear-off lines extending in said first wall, from said free edge, adjacent to said control means.

Advantageously according to this aspect of the invention, the probability is increased that an attempt to disconnect the wall lining to which the control means are connected, from the wall of the package to which said wall lining is glued, is detected by the control means.

According to another aspect of the invention, said first wall to which said control means are connected comprises:
at least two of said easy tear-off lines extending in said first wall, from said free edge, so that said control means are interposed between said two easy tear-off lines;
a crease joining said two easy tear-off lines, said control means and said fold lying on opposite sides with respect to said crease.

Advantageously according to this aspect of the invention, the probability is even more increased, with respect to the preceding aspect, that an attempt to disconnect the wall lining to which the control means are connected, from the wall of the package to which said wall lining is glued, is detected by the control means.

According to another aspect of the invention, at least one of said first walls comprises:
two mutually opposite free edges which originate from a fold at which said first wall is connected to a remaining portion of said substantially flat element;
at least one of said easy tear-off lines extending across said free edges, said gluing means and said fold lying on opposite sides with respect to said easy tear-off line.

Advantageously according to this aspect of the invention, the probability is increased that an attempt to disconnect one of the aforesaid wall linings from the wall of the package to which it is glued causes the tear of the easy tear-off line made at said wall lining.

According to another aspect of the invention, the package comprises a waterproof film including polyethylene and adherent to said substantially flat element at said face thereof facing said space portion (i.e. at the inner face of the substantially flat element),
said waterproof film being interposed between said track and said substantially flat element.

Advantageously, the waterproof film keeps both the space portion enclosed by the package and the conductive track (in conjunction with the control means) from getting wet. The polyethylene also is suitable for being printed with an electrically conductive ink for making the conductive track and does not undergo thermal deformations at the temperatures at which the drying of the corrugated cardboard occurs. The aforesaid waterproof film may therefore be stretched out over the corrugated cardboard sheet during the process of making said sheet and not necessarily at the end of this process, with a significant savings in terms of time and costs.

In addition to the above, interposing the waterproof film between the corrugated cardboard sheet and the conductive track (in conjunction with the control means) ensures that said film is inside the package and accordingly protected by the corrugated cardboard sheet.

According to another aspect of the invention, said track is covered, on the side of said space portion, by a protective layer comprising an acrylic resin.

Advantageously, according to this aspect of the invention, the aforesaid protective layer prevents an object possibly enclosed in the package of the invention from damaging the conductive track should said object come into contact with the latter.

According to another aspect of the invention, said track is covered, on the side of said space portion, by an electrically insulating layer (for example, comprising zinc oxide).

Advantageously according to this aspect of the invention, the aforesaid electrically insulating layer prevents an object possibly enclosed in or introduced into the package of the invention from altering the electric features of the conductive track should said object come into contact with the latter.

BRIEF DESCRIPTION OF THE DRAWINGS

Further objects and advantages of the present invention will become apparent from the detailed description provided below of exemplary embodiments thereof and from the accompanying drawings merely given by way of a non-limiting example, in which.

DETAILED DESCRIPTION OF SOME PREFERRED EMBODIMENTS OF THE INVENTION

In the continuation of the present description, a figure may also be shown with reference to elements not expressly indicated in that figure but in other figures. The scale and proportions of the various elements depicted do not necessarily correspond to the actual ones.

Figure 1:
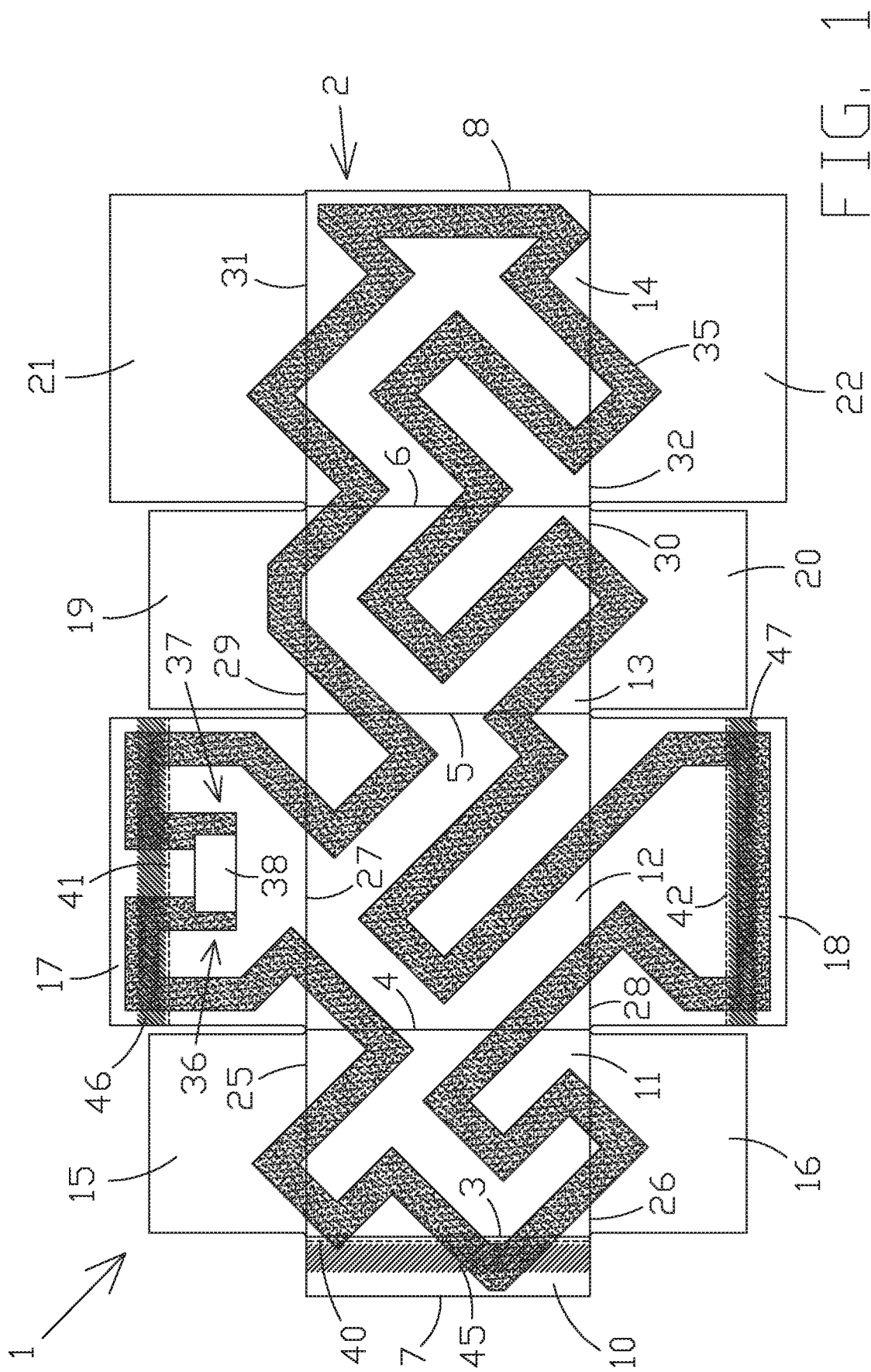
FIG. 1 shows a top plan view of a cut and creased cardboard sheet which can be used in making a package according to the present invention.
Figure 2:
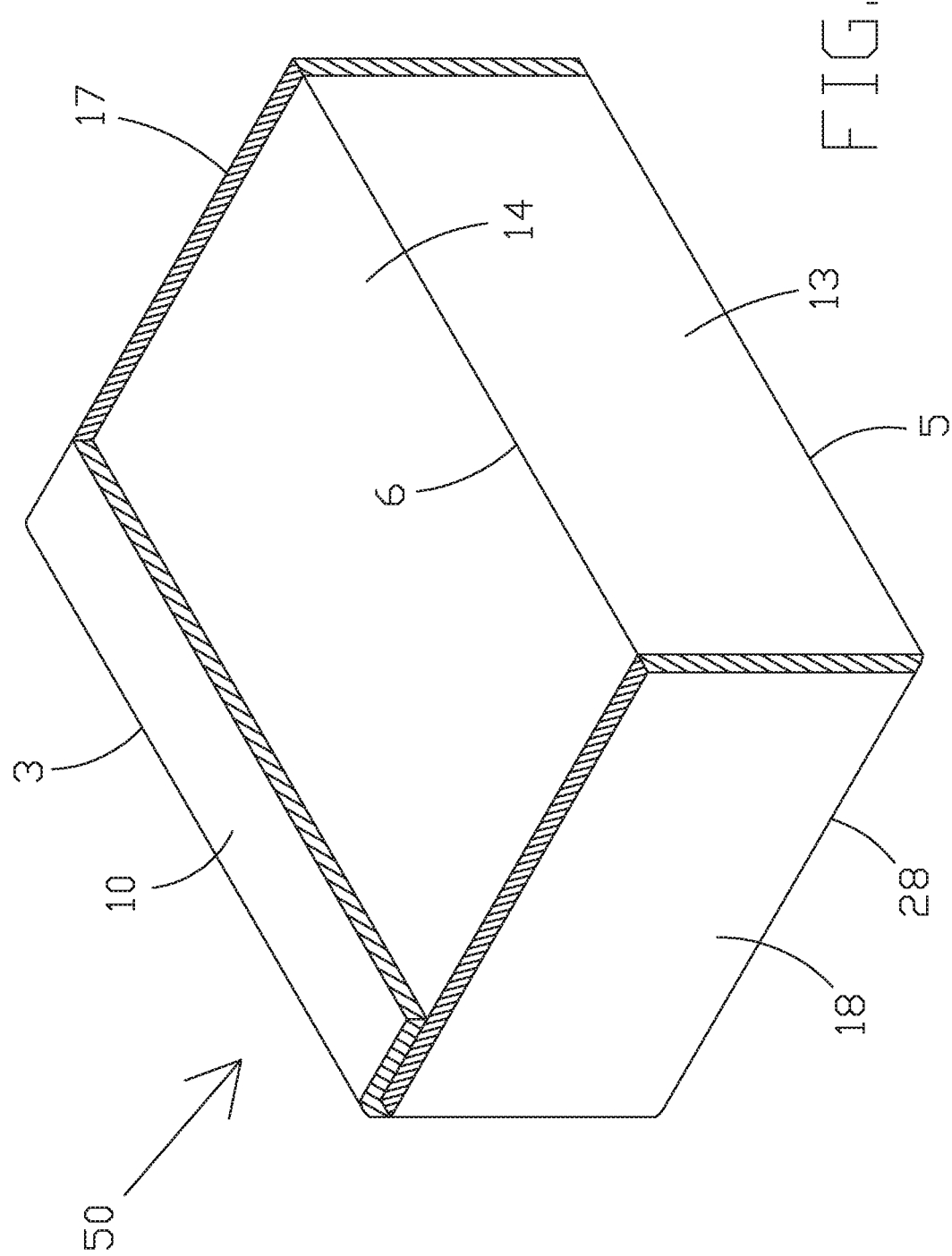
FIG. 2 shows a perspective diagrammatic view of a package according to the present invention, obtained from the sheet in FIG. 1.

FIG. 1 shows a substantially flat element 1, which is foldable onto itself in order to obtain a package 50 of the invention, shown in FIG. 2. Element 1 preferably is a cut and creased cardboard sheet, and more preferably a corrugated cardboard sheet. The latter has a so-called "sandwich" structure, i.e. it comprises two skins or "covers" between which a "core" including at least one corrugated sheet is interposed. The corrugated cardboard is a substantially known material. Therefore, further details will not be provided.

Sheet 1 (shown completely unfolded on a surface in FIG. 1) comprises a longitudinal band 2 on which transverse creases 3, 4, 5 and 6 are made, variously spaced apart from one another to delimit, together with the transverse edges 7 and 8 of band 2, just as many sections 10, 11, 12, 13 and 14. Namely, proceeding in sequence from edge 7 (on the left in FIG. 1) to edge 8 (on the right in FIG. 1):

section 10 is transversely delimited by edge 7 and by crease 3;
section 11 is transversely delimited by creases 3 and 4;
section 12 is transversely delimited by creases 4 and 5;
section 13 is transversely delimited by creases 5 and 6;
section 14 is transversely delimited by crease 6 and by edge 8.

The sections 10, 11, 12, 13 and 14 preferably are square or rectangular in shape. By defining "width" as the dimension of the aforesaid sections parallel to edge 7, the sections 10, 11, 12, 13 and 14 preferably have the same width. Thus, band 2 is preferably shaped like a rectangle. By defining "length" as the dimension of the sections 10, 11, 12, 13 and 14 orthogonal to edge 7, section 11 preferably has the same length as section 13, and section 12 preferably has the same length as section 14. Thus, section 11 preferably is equal to section 13, like section 12 preferably is equal to section 14. Sections 11 and 13 preferably have a shorter length than that of the sections 12 and 14. Section 10 preferably has a shorter length than that of the sections 11 and 13.

Sheet 1 comprises further sections 15, 16, 17, 18, 19, 20, 21 and 22, preferably square or rectangular in shape, connected to band 2 by means of respective creases 25, 26, 27, 28, 29, 30, 31 and 32. Namely:

section 15 is connected, by means of crease 25, to one edge of section 11 orthogonal to crease 3;
section 16 is connected, by means of crease 26, to the other edge of section 11 orthogonal to crease 3. Sections 15 and 16 thus lie on opposite sides with respect to band 2, with the free edge further from band 2, parallel to the creases 25 and 26, respectively;
section 17 is connected, by means of crease 27, to one edge of section 12 orthogonal to crease 4;
section 18 is connected, by means of crease 28, to the other edge of section 12 orthogonal to crease 4. Sections 17 and 18 thus lie on opposite sides with respect to band 2, with the free edge further from band 2, parallel to the creases 27 and 28, respectively;
section 19 is connected, by means of crease 29, to one edge of section 13 orthogonal to crease 5;
section 20 is connected, by means of crease 30, to the other edge of section 13 orthogonal to crease 5. Sections 19 and 20 thus lie on opposite sides with respect to band 2, with the free edge further from band 2, parallel to the creases 29 and 30, respectively;
section 21 is connected, by means of crease 31, to one edge of section 14 orthogonal to crease 6;

section 22 is connected, by means of crease 32, to the other edge of section 14 orthogonal to crease 6. Sections 21 and 22 thus lie on opposite sides with respect to band 2, with the free edge further from band 2, parallel to the creases 31 and 32, respectively.

The sections 15, 17, 19 and 21 lie on the same side with respect to band 2. Similarly, the sections 16, 18, 20 and 22 lie on the same side as band 2 (opposite to the side on which the sections 15, 17, 19 and 21 lie).

The sections 15, 16, 19 and 20 preferably are equal to each other. By defining "length" as the dimension of the aforesaid sections parallel to the creases 25, 26, 29 and 30, the sections 15, 16, 19 and 20 have a length which is almost equal to the length of the sections 11 and 13. By defining "width" as the dimension of the sections 15, 16, 19 and 20 orthogonal to the creases 25, 26, 29 and 30, the sections 15, 16, 19 and 20 have a width which is almost equal to half the length of the sections 12 and 14.

The sections 17, 18, 21 and 22 preferably are equal to each other. By defining "length" as the dimension of the aforesaid sections parallel to the creases 27, 28, 31 and 32, the sections 17, 18, 21 and 22 have a length which is almost equal to the length of the sections 12 and 14. By defining "width" as the dimension of the sections 17, 18, 21 and 22 orthogonal to the creases 27, 28, 31 and 32, the sections 17, 18, 21 and 22 have a width which is almost equal to the length of the sections 11 and 13 (and accordingly, almost equal to the length of the sections 15, 16, 19 and 20).

An electrically conductive track 35 is connected to sheet 1 at a face thereof (facing upwards in FIG. 1). Track 35 comprises two ends 36 and 37 preferably arranged at section 17. As is shown in FIG. 1, track 35 extends, from end 36 to end 37, preferably over all the sections 10, 11, 12, 13, 14, 15, 16, 17, 18, 19, 20, 21 and 22 of sheet 1, intersecting all the creases 3, 4, 5, 6, 25, 26, 27, 28, 29, 30, 31 and 32 of the latter. Track 35 is preferably made by printing a quantity of electrically conductive ink on sheet 1 and is electrically coupled, at the ends 36 and 37, to an electronic control device 38 adapted detect damage (i.e. an at least partial interruption) thereof, that is an alteration of one or more electric features of track 35. Device 38 is preferably adapted to detect a deviation from predetermined values of one or more electric features of track 35. Device 38 is preferably connected to sheet 1 at section 17. More preferably, device 38 is connected to sheet 1 at the same face of the latter where track 35 is printed, and even more is preferably interposed between the ends 36 and 37 of the latter.

In greater detail, device 38 preferably comprises two terminals at which it is electrically connected at the ends 36 and 37 of track 35. Said connection preferably takes place by using an electrically conductive adhesive. More preferably, device 38 is supplied by means of an electric accumulator which is activated when device 38 is connected to sheet 1, thus creating a short-circuit between device 38 and track 35.

Device 38 is preferably adapted to:
repeatedly apply, at random or predetermined time intervals, a voltage between the ends 36 and 37, and measure a current which is generated in track 35 in response to the aforesaid voltage;
each time a voltage is applied, compare the current measured with the predefined values (corresponding to the case in which track 35 is intact);
each time a deviation of a given entity is detected between the current measured and the aforesaid predefined values, save the detection of said deviation. Device 38 could comprise a timer. Not only is device 38 adapted to save the detection of said deviation in this case, but also the moment in time in which said deviation was detected.

When detected, the aforesaid deviation means that track 35 (and presumably in conjunction with sheet 1) has undergone damage which has altered the electric features thereof.

Advantageously, since device 38 is supplied by means of an electric accumulator which is preferably activated when device 38 is connected to sheet 1, device 38 preferably starts operating when it is connected to sheet 1, i.e. when it is electrically coupled to track 35.

Device 38 is preferably also adapted to communicate, or to make accessible to third parties, the information concerning having detected or not detected a given entity between the current measured and the aforesaid predetermined values (i.e. damage of track 35, an alteration of an electric feature thereof). This preferably takes place by means of a known technology of "NFC" (i.e. "near field communication") type. In this case, by moving a common smartphone close to device 38, the latter may be queried to know if a deviation like the aforesaid deviation has been detected. NFC technologies are known and widespread. Therefore, further details will not be provided.

Sheet 1 comprises three easy tear-off lines 40, 41 and 42 made at the sections 10, 17 and 18, respectively. Line 40 preferably is parallel to crease 3 and extends, close to the latter, across the two mutually opposite free edges of section 10 which are consecutive to crease 3 (i.e. which start from the latter).

Line 41 preferably is parallel to crease 27, and extends, close to the free edge of section 17 the furthest from crease 27, across the two mutually opposite free edges of section 17 which are consecutive to crease 27. Line 42 preferably is parallel to crease 28, and extends, close to the free edge of section 18 the furthest from crease 28, across the two mutually opposite free edges of section 18 which are consecutive to crease 28. More preferably, the lines 41 and 42 are equal in specular manner.

The lines 40, 41 and 42 are made at the face of sheet 1 where track 35 is printed (facing upwards in FIG. 1) and are arranged so as to intersect the latter in each of the sections 10, 17 and 18. The tear-off of the lines 40, 41 and 42 at the intersection with track 35 therefore cause damage to the latter, i.e. a partial or complete interruption thereof. If it occurs, said damage alters the electric features of track 35, thus inducing a deviation—which can be detected by device 38—of said features from the predetermined values mentioned above.

The lines 40, 41 and 42 preferably are "hatched semi-cuts" or "hatched half-cuts". Namely, each of the lines 40, 41 and 42 comprises a plurality of cuts and/or holes interposed between said stretches of intact cardboard and extending into the thickness of sheet 1 so as not to reach the cover corresponding to the face of sheet 1 opposite to that where track 35 is printed. Since said cuts and/or holes are non-through cuts and/or holes, the lines 40, 41 and 42 are not visible at the face of sheet 1 opposite to that where track 35 is printed.

Incidentally, the aforesaid cuts and/or holes of the lines 40, 41 and 42 are of such sizes as to possibly only partially interrupt track 35 at the intersections of said lines with the latter. In other words, the lines 40, 41 and 42 intersect track 35 without cutting it, i.e. so as to allow the circulation of current along it from end 36 to end 37. Again incidentally, the aforesaid values with which device 38 is adapted to compare the current measured thereby each time it applies a voltage to track 35 are predetermined while considering the possible partial interruptions induced by the lines 40, 41 and 42.

FIG. 1 shows device 38 connected to section 17 in such a position as to be interposed between line 41 and crease 27. However, it could be connected to section 17 on the opposite side of crease 27 with respect to line 41.

Sheet 1 comprises three adhesive strips 45, 46 and 47 applied to the sections 10, 17 and 18, respectively at the face of sheet 1 where track 35 is printed (facing upwards in FIG. 1). Namely, the strips 45, 46 and 47 are applied to sheet 1 close to the lines 40, 41 and 42, respectively, preferably without intersecting the latter. Strip 45 preferably is parallel to crease 3, lies on the side opposite to the latter with respect to line 40 and extends across the two mutually opposite free edges of section 10 which are consecutive to crease 3. Strip 46 preferably is parallel to crease 27, lies on the side opposite to the latter with respect to line 41 and extends across the two mutually opposite free edges of section 17 which are consecutive to crease 27. Strip 47 preferably is parallel to crease 28, lies on the side opposite to the latter with respect to line 42 and extends across the two mutually opposite free edges of section 18 which are consecutive to crease 28.

As mentioned above, the strips 45, 46 and 47 are applied to sheet 1 at the face of sheet 1 where track 35 is printed. They are preferably arranged so as to intersect track 35 in each of the sections 10, 17 and 18, i.e. so as to cover at least a stretch of track 35 in each of the sections 10, 17 and 18.

Like the aforesaid stretches of track 35, device 38 could be at least partially covered by one of the strips 45, 46 and 47. This could occur by way of example, if track 38 were connected to section 17 on the opposite side of crease 27 with respect to line 41 rather than being connected to section 17 in such a position as to be interposed between line 41 and crease 27.

Incidentally, the strips 45, 46 and 47 are electrically insulating, i.e. of such a nature as not to interfere with the electric features of track 35.

Sheet 1 may be covered, at the face thereof (facing upwards in FIG. 1) where track 35 is printed, by a waterproof film preferably comprising polyethylene. If present, said film completely covers said face of sheet 1 below device 38 and of track 35, so as to be interposed between the latter and sheet 1. If made with electrically conductive ink, track 35 therefore is printed on said film (possibly with the interposition of an adhesion promoting paint) rather than directly on sheet 1.

Regardless of the presence or lack of the aforesaid waterproof film, track 35, and preferably device 38 with it, may be covered (possibly with the interposition of an adhesion promoting paint) by a protective layer preferably comprising an acrylic resin and/or an electrically insulating layer preferably comprising zinc oxide. If track 35 is covered by both said layers, the electrically insulating layer is preferably interposed between track 35 and the protective layer.

Incidentally, like the strips 45, 46 and 47, said waterproof film, like the aforesaid layers, are of such a nature as not to interfere with the electric features of track 35.

Sheet 1 is preferably creased by means of "inverse creasing". In other words, the crease of sheet 1 is preferably obtained by cutting the latter at the face thereof opposite to that where track 35 is connected. By operating so, the cutting die advantageously does not compromise the conductivity of track 35 (since the cutting takes place after the application of track 35 to sheet 1).

FIG. 2 shows sheet 1 after the following sequence of folds has been carried out:
a) a folding, preferably by 90°, of section 15 with respect to section 11, about crease 25,
a folding, preferably by 90°, of section 16 with respect to section 11, about crease 26,
a folding, preferably by 90°, of section 19 with respect to section 13, about crease 29, and
a folding, preferably by 90°, of section 20 with respect to section 13 about crease 30.
The sections 15, 16, 19 and 20 are folded, with regard to the sections 11 and 13, on the same side where track 35 is printed. In other words, by taking as upper face of sheet 1 that facing the observer in FIG. 1, the sections 15, 16, 19 and 20 are caused to rotate upwards with respect to the sections 11 and 13;
b) a folding, preferably by 90°, of section 13 (and in conjunction with the sections 14, 19, 20, 21 and 22) with respect to section 12, about crease 5. Said folding is carried out on the same side where track 35 is printed. In other words, by taking again as upper face of sheet 1 that facing the observer in FIG. 1, section 13 (in conjunction with the sections 14, 19, 20, 21 and 22) is caused to rotate towards the left with respect to section 12.
At the end of said folding, the free edges of the sections 19 and 20 which are consecutive to crease 5 are opposed to the creases 27 and 28, respectively;
c) a folding, preferably by 90°, of section 11 (in conjunction with the sections 10, 15 and 16) with respect to section 12, about crease 4.
Said folding is carried out on the same side where track 35 is printed. In other words, by taking again as upper face of sheet 1 that facing the observer in FIG. 1, section 11 (in conjunction with the sections 10, 15 and 16) is caused to rotate towards the right with respect to section 12.
At the end of said folding:
the free edges of the sections 15 and 16 which are consecutive to crease 4 are opposed to the creases 27 and 28, respectively, and
the free edges of the sections 15 and 16 which are parallel to the creases 25 and 26 are opposed to the free edges of section 19 and 20, respectively, which are parallel to the creases 29 and 30;
d) a folding, preferably by 90°, of section 14 (in conjunction with the sections 21 and 22) with respect to section 13, about crease 6.
Said folding is carried out on the same side where track 35 is printed.
At the end of said folding:
the free edge 8 of section 14 is opposed to crease 3,
the free edges of the sections 19 and 20 which are consecutive to crease 6 are opposed to the creases 31 and 32, respectively, and
the free edges of the sections 15 and 16 which are consecutive to crease 3 are opposed to the creases 31 and 32, respectively;
e) a folding, preferably by 90°, of section 21 with respect to section 14, about crease 31, and
a folding, preferably by 90°, of section 22 with respect to section 14, about crease 32.
Said folding is carried out on the same side where track 35 is printed.
At the end of said folding:
the free edges of the sections 21 and 22 which are parallel to the creases 31 and 32 are opposed to the creases 27 and 28, respectively, the sections 15 and 16 are opposed to the sections 21 and 22, respectively, internally with respect to the latter, and the sections 19 and 20 are opposed to the sections 21 and 22, respectively, internally with respect to the latter;

f) a folding, preferably by 90°, of section 17 with respect to section 12, about crease 27, and a folding, preferably by 90°, of section 18 with respect to section 12, about crease 28.

The sections 17 and 18 are folded, with regard to section 12, on the same side where track 35 is printed. In other words, by taking again as upper face of sheet 1 that facing the observer in FIG. 1, the sections 17 and 18 are caused to rotate upwards with respect to section 12.

At the end of said folding, the sections 17 and 18 are opposed to the sections 21 and 22, respectively, externally with respect to the latter. In other words, at the end of said folding, section 17 is interposed between the sections 15 and 19, and section 21. Similarly, section 18 is interposed between the sections 16 and 20, and section 22.

Due to the effect of the strips 46 and 47, at the end of said folding, the sections 17 and 18 are glued to the sections 21 and 22, respectively. Said gluing prevents the sections 13, 14, 17, 18, 19, 20, 21 and 22 from being unfolded due to an elastic return of sheet 1;

g) a folding, preferably by 90°, of section 10 with respect to section 11, about crease 3.

Said folding is carried out on the same side where track 35 is printed.

At the end of said folding, section 10 is opposed to section 14 externally to the latter, and is glued thereto due to the effect of strip 45. Said gluing prevents section 10 from being unfolded due to an elastic return of sheet 1.

As may be noted in FIG. 2, once the above-listed folding has been carried out, sheet 1 looks like a package 50 of the invention, preferably having rectangular parallelepiped shape and comprising:

a base coinciding with section 12;

two side walls coinciding with the sections 11 and 13, respectively, mutually opposed and preferably orthogonally connected to base 12 by two folds originating at the creases 4 and 5, respectively;

an upper wall coinciding with section 14, preferably parallel to base 12 and preferably orthogonally connected to wall 13 by a fold originating at crease 6;

two other side walls coinciding with the sections 21 and 22, respectively, mutually opposed and preferably orthogonally connected to wall 14 by two folds originating at the creases 31 and 32, respectively;

two side wall linings coinciding with the sections 15 and 19, respectively, and preferably orthogonally connected to the walls 11 and 13, respectively, by two folds originating at the creases 25 and 29, respectively. The wall linings 15 and 19 are opposed to wall 21, internally with respect to the latter;

two other side wall linings coinciding with the sections 16 and 20, respectively, and preferably orthogonally connected to the walls 11 and 13, respectively, by two folds originating at the creases 26 and 30, respectively. The wall linings 16 and 20 are opposed to wall 22, internally with respect to the latter;

another side wall lining coinciding with section 17 and preferably orthogonally connected to base 12 by a fold originating at crease 27. The wall lining 17 is opposed and glued to wall 21, externally to the latter;

another side wall lining coinciding with section 18 and preferably orthogonally connected to base 12 by a fold originating at crease 28. The wall lining 18 is opposed and glued to wall 22, externally to the latter;

an upper wall lining coinciding with section 10 and preferably orthogonally connected to wall 11 by a fold originating at crease 3. The wall lining 10 is opposed and glued to wall 14, externally to the latter.

The base 12, the walls 11, 13, 14, 21 and 22, and the wall linings 10, 15, 16, 17, 18, 19 and 20 were previously referred to as "plurality of walls" as a whole and delimit a space portion which substantially is rectangular parallelepiped-shaped enclosed therebetween.

The wall linings 10, 17 and 18 were previously referred to as "first walls of said plurality". The walls 14, 21 and 22 were previously referred to as "second walls of said plurality".

The wall linings 10, 17 and 18 are at least partially opposed, at the inner face thereof (i.e. at the face of the wall linings 10, 17, and 18 facing said space portion), to the walls 14, 21 and 22, respectively, at the outer face thereof (i.e. at the face of the walls 14, 21 and 22 facing the exterior of package 50).

The wall linings 10, 17 and 18 are connected to the walls 14, 21 and 22, respectively, by the strips 45, 46 and 47 so as to prevent sheet 1 from being unfolded (and accordingly an involuntary opening of package 50). Namely, each of the strips 45, 46 and 47 causes gluing between a portion of the inner face of the wall linings 10, 17 and 18, respectively, and a portion of the outer face of the walls 14, 21 and 22 opposed thereto. Incidentally, said inner face portions of the wall linings 10, 17 and 18 are close to the lines 40, 41 and 42, respectively, without being crossed by the latter (at least for a stretch thereof).

As mentioned above, the strips 45, 46 and 47 are preferably arranged so as to intersect track 35 in each of the wall linings 10, 17 and 18, i.e. so as to cover at least a stretch of track 35 in each of the wall linings 10, 17 and 18. Therefore, the strips 45, 46 and 47 are preferably at least partially interposed between track 35 and the walls 14, 21 and 22, respectively. In other words, one or more of the aforesaid inner face portions of the wall linings 10, 17 and 18 preferably comprise some stretches of track 35 so that the strips 45, 46 and 47 at least partially serve as gluing means also between said stretches of track 35 and said outer face portions of the walls 14, 21 and 22.

As mentioned above, if rather than being connected to the wall lining 17 in such a position as to be interposed between line 41 and fold 27, device 38 were connected to the wall lining 17 on the opposite side of fold 27 with respect to line 41, like the aforesaid stretches of track 35, device 38 could be at least partially covered by strip 46. Strip 46 is at least partially interposed between device 38 and wall 21 in this case. In other words, the aforesaid inner face portion of the wall lining 17 in this case at least partially comprises device 38 so that strip 46 at least partially serves as gluing means also between device 38 and the aforesaid outer face portion of wall 21.

Incidentally, rather than being applied on the wall linings 10, 17 and 18 at the face of sheet 1 where track 35 is printed, the strips 45, 46 and 47 could similarly be applied in the corresponding positions (with reference to package 50) on the walls 14, 21 and 22 at the face of sheet 1 opposite to that where track 35 is printed.

Incidentally, in package 50, track 35 is printed on the inner face of base 12, of the walls 11, 13, 14, 21 and 22 and of the lining walls 10, 15, 16, 17, 18, 19 (i.e. on the face thereof facing said space portion), and device 38 is applied on the wall lining 17 at the inner face thereof. Also the lines 40, 41 and 42 are made on the wall linings 10, 17 and 18 at the inner face thereof and extend into the thickness of the wall linings 10, 17 and 18 so as not to reach the cover corresponding to the outer face thereof.

Incidentally if present, the waterproof film mentioned above adheres to base 12, to the walls 11, 13, 14, 21 and 22 and to the wall linings 10, 15, 16, 17, 18, 19 at the inner face thereof, below track 35. Said film therefore keeps both the space portion enclosed by package 50 and track 35, in conjunction with device 38, from getting wet.

Incidentally, if present, the protective layer and electrically insulating layer mentioned above cover track 35 inside package 50, i.e. on the side of the space portion enclosed by package 50. Therefore, said layers prevent an object possibly enclosed in package 50 from damaging track 35 or from altering the electric features thereof (thus creating, for example, electrically conductive bridges) should said object come into contact with track 35.

The wall linings 10, 17 and 18 in package 50 are glued to the walls 14, 21 and 22 externally to the latter and the easy tear-off lines 40, 41 and 42 are made thereon. At least one of the wall linings 10, 17 and 18 is to be disconnected from wall 14, 21 and 22 to which it is glued to access the space portion inside package 50.

The adhesion between each wall lining 10, 17 or 18 and wall 14, 21 or 22 to which it is glued by strip 45, 46 or 47 is such that the force to be applied to disconnect a wall lining 10, 17 or 18 from wall 14, 21 or 22 to which it is glued thus overcoming said adhesion is greater than the force to be applied to disconnect said wall lining 10, 17 or 18 from said wall 14, 21 or 22 by tearing off said wall lining 10, 17 or 18 along line 40, 41 or 42 present therein.

In other words, the adhesion between each wall lining 10, 17 or 18 and wall 14, 21 or 22 to which it is glued by strip 45, 46 or 47 is such that the force to be applied to unglue the wall lining 10, 17 or 18 from wall 14, 21 or 22 to which it is glued is greater than the force to be applied to disconnect said wall lining 10, 17 or 18 from said wall 14, 21 or 22 by tearing off said wall lining 10, 17 or 18 along line 40, 41 or 42 present therein.

Incidentally, the disconnection of a wall lining 10, 17 or 18 from wall 14, 21 or 22 upon the tearing off of line 40, 41 or 42 on said wall lining 10, 17 or 18 may take place:

by division of said wall lining 10, 17 or 18 into two parts along said line 40, 41 or 42. In this case, said wall lining 10, 17 or 18 loses a part thereof which remains glued to said wall 14, 21 or 22, or by at least partial removal of said wall lining 10, 17 or 18 of the cover corresponding to the inner face portion of said wall lining 10, 17 or 18 glued to said wall 14, 21 or 22. In this case, said wall lining 10, 17 or 18 loses a part of said cover which remains glued to said wall 14, 21 or 22. Incidentally, if said portion of cover which remains glued to said wall 14, 21 or 22 comprises a stretch of track 35 and/or device 38, also said track and/or device 38 are removed from the wall lining 10, 17 or 18 due to the effect of the adhesion of the latter to the corresponding wall 14, 21 or 22. In particular, if said portion of cover which remains glued to said wall 21 comprises device 38, also the latter is removed from the wall lining 17 due to the effect of the adhesion of the latter to wall 21. Here, the tear-off of line 41 gives rise to an uncoupling of device 38 from track 35.

In other words, if to one of the walls linings 10, 17 and 18, there is applied a torque tending to cause it to rotate (about fold 3, 27 or 28) with respect to wall 14, 21 or 22 to which it is glued, the torque required to cause the tear-off of line 40, 41 or 42 on said wall lining 10, 17 or 18 is less than the torque required to overcome the gluing due to strip 45, 46 or 47. Due to the effect of this, by applying a progressively increasing torque to one of the wall linings 10, 17 and 18 before said wall lining 10, 17 or 18 is unglued from wall 14, 21 or 22 to which it is glued, line 40, 41 or 42 on said wall lining 10, 17 or 18 tears off, causing the latter to disconnect from wall 14, 21 or 22 possibly with an at least partial removal of the inner face portion of said wall lining 10, 17 or 18 which remains glued to said wall 14, 21 or 22.

In light of the above, each time an attempt is made to disconnect a wall lining 10, 17 or 18 from wall 14, 21 or 22 to which it is glued, line 40, 41 or 42 on said wall lining 10, 17 or 18 is torn off, thus damaging (i.e. at least partially interrupting) track 35 (since it is intersected by the lines 40, 41 and 42). If it occurs, said damage alters the electric features of track 35, thus inducing a deviation—which can be detected by device 38—of said features from the predetermined values mentioned above. Thus, track 35 extends over the inner face of base 12, of the walls 11, 13, 14, 21 and 22 and of the wall linings 10, 15, 16, 17, 18, 19 so that an opening of package 50 causes damage to track 35 and accordingly an alteration of the electric features thereof, which can be detected and communicated to third parties by device 38.

Advantageously, by the lines 40, 41 and 42 comprising non-through holes and/or cuts, they are not visible from the exterior of package 50. An ill-intentioned person who intends opening package 50 therefore cannot be aware of the presence of the lines 40, 41 and 42. Additionally, even if said ill-intentioned person were aware of the presence of the lines 40, 41 and 42, the person could not in any case be aware of the position thereof.

According to one variant of sheet 1 not shown in the figures, said sheet comprises a through hole made at an area of said sheet where device 38 is connected so that the latter occludes said hole. Advantageously, if it is not possible to query device 38 in a given moment to know if a deviation has or has not been detected between the current measured and the predetermined values (for example, due to a malfunctioning of the NFC technology), a user of package 50 may verify the presence of device 38 by means of the through hole in sheet 1.

Incidentally, if the package is provided with the waterproof film mentioned above, the latter is not perforated (so as to include the hole and keep the space portion enclosed by package 50, track 35 and device 38 from getting wet) and substantially is permeable to light at least at the aforesaid through hole.

Figure 3:
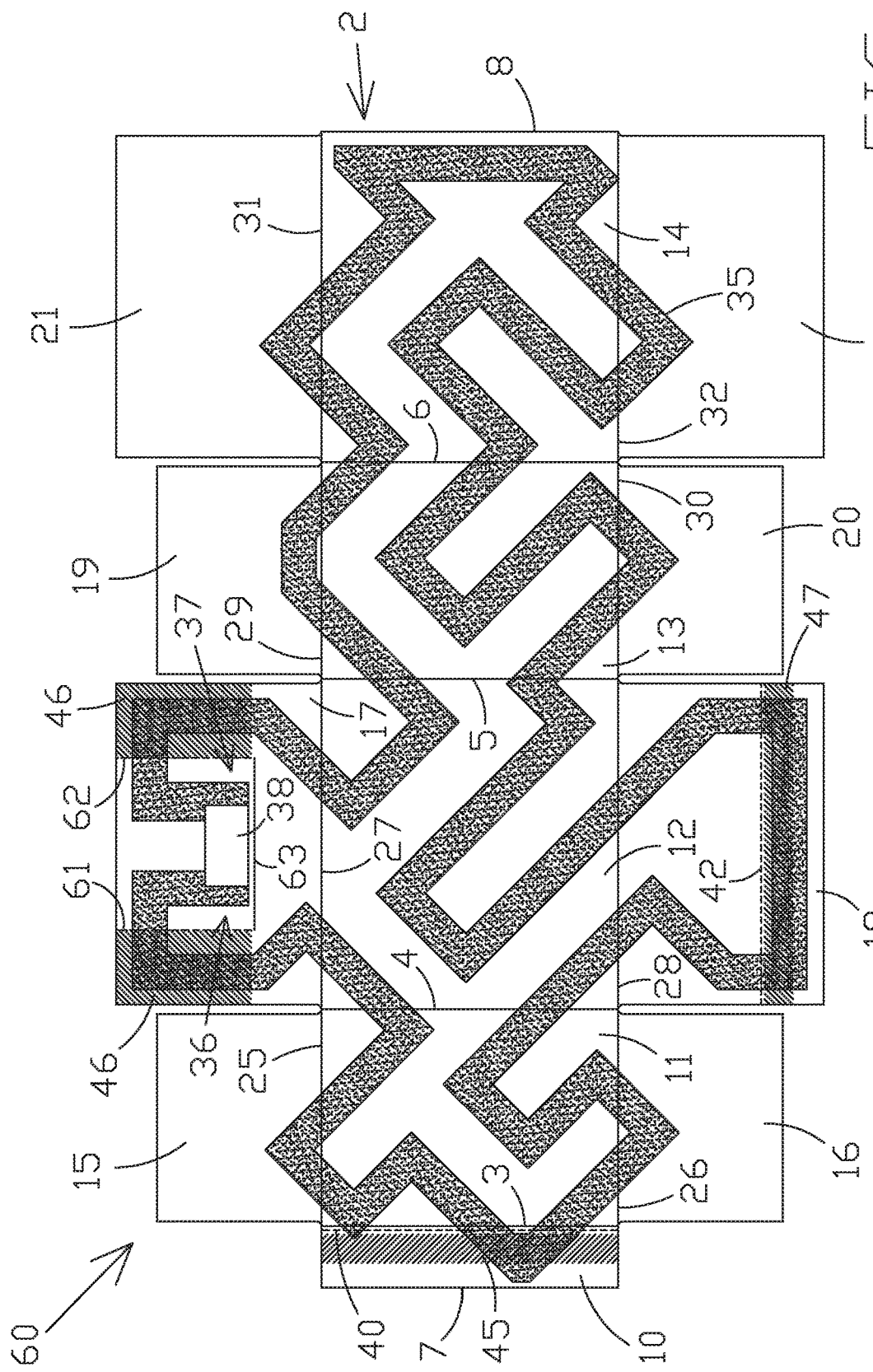
FIG. 3 shows a top plan view of a variant of the sheet in FIG. 1, which can be used in making a variant of the package in FIG. 2.

FIG. 3 shows a substantially flat element 60 which is foldable onto itself which differs from element 1 in that it does not comprise two easy tear-off lines 61 and 62 in place of line 41, they also being made at the face of sheet 1 where track 35 is printed. Each of the lines 61 and 62 extends into section 17 from the free edge of the latter opposite to crease 27, preferably orthogonal thereto. Therefore, unlike line 41, the lines 61 and 62 are not parallel to crease 27. Conversely, the lines 61 and 62, extending towards the latter, are preferably arranged orthogonal to crease 27. Each of the lines 61 and 62 intersects track 35 in section 17. In particular, they are positioned so that, and extend towards crease 27 to such an extent that, device 28 is preferably interposed between said lines 61 and 62. Each of the lines 61 and 62 extends from the aforesaid free edge (opposite to crease 27) into section 17 adjacent to device 38.

As said for the lines 40, 41 and 42, the tear-off of the lines 61 and 62 at the intersection thereof with track 35 causes damage to the latter, i.e. a partial or complete interruption thereof. If it occurs, said damage alters the electric features of track 35, thus inducing a deviation—which can be detected by device 38—of said features from the predetermined values mentioned above.

Since device 38 is interposed between the lines 61 and 62 and track 35 intersects each of these, the tear-off of one of the lines 61 and 62 gives rise to an uncoupling of device 38 from track 35.

Like the lines 40, 41 and 42, the lines 61 and 62 preferably are "hatched semi-cuts" or "hatched half-cuts". Namely, each of the lines 61 and 62 comprises a plurality of cuts and/or holes interposed between said stretches of intact cardboard and extending into the thickness the sheet 1 so as not to reach the cover corresponding to the face of sheet 1 opposite to that where track 35 is printed. Since said cuts and/or holes are non-through cuts and/or holes, the lines 61 and 62 are not visible at the face of sheet 1 opposite to that where track 35 is printed.

Incidentally, as said for the lines 40, 41 and 42, the cuts and/or holes of the lines 61 and 62 are of such sizes as to possibly only partially interrupt track 35 at the intersections of said lines 61 and 62 with the latter. In other words, the lines 61 and 62 intersect track 35 without cutting it, i.e. so as to allow the circulation of current along it from end 36 to end 37. Again incidentally, the aforesaid values with which device 38 is adapted to compare the current measured thereby each time it applies a voltage to track 35 are predetermined while considering the possible partial interruptions induced by the lines 61 and 62.

The lines 61 and 62 preferably have the same length and are preferably joined to each other by a crease 63 at the end thereof closest to crease 27. Incidentally as is shown in FIG. 3, crease 63 is preferably arranged orthogonal to the lines 61 and 62 and parallel to crease 27. In addition to preferably being interposed between the lines 61 and 62, device 28 lies on the side opposite to crease 27 with respect to crease 63.

Like in sheet 1, the adhesive strip 46 preferably is parallel to crease 27. It extends across the two mutually opposite free edges of section 17 which are consecutive to crease 27, lying on the opposite side of crease 63 with respect to crease 27. As shown in FIG. 3, strip 46 preferably does not have the stretch thereof interposed between the lines 61 and 62. Due to this, device 38 and the two remaining stretches of strip 46 lie on opposite sides with respect to the lines 61 and 62. Said remaining stretches of strip 46 moreover are preferably positioned so as to cover at least one stretch of track 35, respectively.

According to one variant of element 60 not shown in the drawings, the latter comprises only line 61 or 62 and does not have crease 63.

By performing the same folding operations described with reference to sheet 1 on element 60, there is obtained a package of the invention, which differs from package 50 due to the presence of crease 63 and of the lines 61 and 62 in place of line 41, and due to the absence of the stretch of strip 46 between the lines 61 and 62.

As said with reference to package 50, the wall linings 10, 17 and 18 in the package obtained from sheet 60 are glued to the walls 14, 21 and 22 externally to the latter and the easy tear-off lines 40, 61, 62 and 42 are made thereon. At least one of the wall linings 10, 17 and 18 is to be disconnected from wall 14, 21 and 22 to which it is glued to access the space portion inside package.

With regard to the adhesion between the wall linings 10 and 18 to the walls 14 and 22 to which they are glued by the strips 45 and 47, all the considerations disclosed with reference to package 50 are valid. The adhesion between the wall lining 17 and wall 21 to which it is glued by remaining stretches of strip 46 is such that the force to be applied to disconnect said wall lining 17 from wall 21 thus overcoming said adhesion is greater than the force to be applied to disconnect said wall lining 17 from said wall 21 by tearing off the lines 61 and 62.

If there is applied, to the wall lining 17, at the free edge thereof opposite to fold 27 and in an intermediate position between the lines 61 and 62, a torque tending to cause the wall lining 17 to rotate (about crease 63) with respect to wall 21 to which it is glued, the torque required to cause the tear-off of the lines 61 and 62 is less than the torque required to overcome the gluing due to the remaining stretches of strip 46. Due to the effect of this, by applying a progressively increasing torque to the wall lining 17 (at the free edge thereof opposite to fold 27 and in an intermediate position between the lines 61 and 62) before the wall lining 17 is unglued from wall 21, the lines 61 and 62 tear off, causing the wall lining 17 to at least partially disconnect from wall 21, possibly with an at least partial removal of an inner face portion of said wall lining 17 which remains glued to said wall 21.

In light of the above, each time an attempt is made to disconnect the wall lining 17 from wall 21 (by applying a torque at the free edge of the wall lining 17 opposite to fold 27 and in an intermediate position between the lines 61 and 62), the lines 61 and 62 tear off, not only damaging track 35 (since it is intersected thereby), but also inducing the uncoupling of device 38 from track 35 (since it is interposed between the lines 61 and 62). If it occurs, said damage necessarily alters the electric features of track 35, thus inducing a deviation, which can be detected by device 38, of said features from the aforesaid predetermined values. Thus, track 35 extends over the inner face of base 12, of the walls 11, 13, 14, 21 and 22 and of the wall linings 10, 15, 16, 17, 18, 19 so that an opening of the package resulting from element 60 causes damage to track 35 and accordingly an alteration of the electric features thereof, which can be detected and communicated to third parties by device 38.

Advantageously, by the lines 61 and 62 comprising non-through holes and/or cuts, they are not visible from the exterior of said package. An ill-intentioned person who intends opening the package therefore cannot be aware of the presence of the lines 61 and 62. Additionally, even if said ill-intentioned person were aware of the presence of the lines 61 and 62, the person could not in any case be aware of the position thereof.

On the basis of the description provided for a preferred exemplary embodiment, it is obvious that certain changes can be made by those skilled in the art without departing from the scope of the invention as defined by the following claims.

The invention claimed is:
1. A package comprising:
   a substantially flat element made of corrugated cardboard and at least partially folded onto itself so as to give rise to a plurality of walls connected to one another by respective folds, said walls delimiting a space portion enclosed therebetween, first walls of said plurality being respectively and at least partially opposed, at a face thereof facing said space portion, to second walls of said plurality, at a face thereof facing the exterior of said package, said corrugated cardboard comprising two covers between which a core including at least one corrugated sheet is interposed;

connection means between said first walls and said second walls to which said first walls are respectively and at least partially opposed, the connection between said first and second walls preventing said substantially flat element from being unfolded;

an electrically conductive track connected to said substantially flat element at a face thereof facing said space portion, said track extending over said walls so that an opening of said package causes damage to said track;

control means electrically coupled to said track and operable to detect damage thereof, said control means being connected to said substantially flat element at the face thereof facing said space portion, wherein, for each pair comprising one of said first walls and one of said second walls connected to each other by said connection means:

said substantially flat element comprises easy tear-off lines provided at the face of said first wall facing said space portion, said easy tear-off lines comprising cuts and/or holes extending into the thickness of said substantially flat element so as not to reach the cover corresponding to the face of said first wall facing an exterior of said package, said easy tear-off lines intersecting said track so that the tear-off of said lines at an intersection thereof with said track causes damage to the track which can be detected by said control means, and said connection means comprising gluing means between at least one portion of the face of said first wall facing said space portion, and one portion, opposed thereto, of the face of said second wall facing the exterior of said package, adhesion between said face portions of said first and second walls by said gluing means being so that a force to be applied to disconnect said first and second walls, from each other thus overcoming said adhesion, is greater than the force to be applied to disconnect said first and second walls from each other by tearing said first wall along said easy tear-off lines so that part of said first wall remains adhered to said second wall to which it is at least partially opposed, said face portion of said first wall being at least partially close to said easy tear-off lines, at least one stretch of said easy tear-off lines not crossing said face portion of said first wall.

2. A package according to claim 1, wherein said portion of said first wall connected to said portion of said second wall said gluing means, in one or more of said pairs of first and second walls, comprises a stretch of said track so that said gluing means also at least partially act as gluing means between said stretch of said track and said portion of said second wall.

3. A package according to claim 1, wherein said control means are connected to said substantially flat element at one of said first walls.

4. A package according to claim 3, wherein said substantially flat element comprises a through hole obtained at an area of said substantially flat element where said control means are connected so that the control means occlude said hole.

5. A package according to claim 3, wherein said portion of said first wall connected to said portion of said second wall by said gluing means, in said pair of first and second walls comprising said first wall to which said control means are connected, comprises said control means so that said gluing means also at least partially act as gluing means between said control means and said portion of said second wall.

6. A package according to claim 3, wherein said first wall to which said control means are connected comprises:

a free edge opposite to a fold at which said first wall is connected to a remaining portion of said substantially flat element;

at least one of said easy tear-off lines extending in said first wall, from said free edge, adjacent to said control means.

7. A package according to claim 6, wherein said first wall to which said control means are connected comprises:

at least two of said easy tear-off lines extending in said first wall, from said free edge, so that said control means are interposed between said two easy tear-off lines;

a crease joining said two easy tear-off lines, said control means and said fold lying on opposite sides with respect to said crease.

8. A package according to claim 1, wherein at least one of said first walls comprises:

two mutually opposite free edges which originate from a fold at which said first wall is connected to a remaining portion of said substantially flat element;

at least one of said easy tear-off lines extending across said free edges, said gluing means and said fold lying on opposite sides with respect to said at least one of said easy tear-off lines.

9. A package according to claim 1, further comprising a waterproof film including polyethylene and adhering to said substantially flat element at said face thereof facing said space portion, said waterproof film being interposed between said track and said substantially flat element.

10. A package according to claim 1, wherein said track is covered, on the side of said space portion, by a protective layer comprising an acrylic resin.

11. A package according to claim 1, wherein said track is covered, on the side of said space portion, by an electrically insulating layer.

12. A package according to claim 1, wherein said substantially flat element is folded onto itself at respective creases, said creases being at the face of said substantially flat element opposite to that where said track is connected.

13. A package according to claim 2, wherein said control means are connected to said substantially flat element at one of said first walls.

14. A package according to claim 4, wherein said portion of said first wall connected to said portion of said second wall by said gluing means, in said pair of first and second walls comprising said first wall to which said control means are connected, comprises said control means so that said gluing means also at least partially act as gluing means between said control means and said portion of said second wall.

15. A package according to claim 13, wherein said portion of said first wall connected to said portion of said second wall by said gluing means in said pair of first and second walls comprising said first wall to which said control means are connected, comprises said control means so that said gluing means also at least partially act as gluing means between said control means and said portion of said second wall.

16. A package according to claim 4, wherein said first wall to which said control means are connected comprises:
   a free edge opposite to a fold at which said first wall is connected to a remaining portion of said substantially flat element;
     at least one of said easy tear-off lines extending in said first wall, from said free edge, adjacent to said control means.

17. A package according to claim 5, wherein said first wall to which said control means are connected comprises:
   a free edge opposite to a fold at which said first wall is connected to a remaining portion of said substantially flat element;
     at least one of said easy tear-off lines extending in said first wall, from said free edge, adjacent to said control means.

18. A package according to claim 2, wherein at least one of said first walls comprises:
   two mutually opposite free edges which originate from a fold at which said first wall is connected to a remaining portion of said substantially flat element;
   at least one of said easy tear-off lines extending across said free edges,
     said gluing means and said fold lying on opposite sides with respect to said at least one of said easy tear-off lines.

19. A package according to claim 3, wherein at least one of said first walls comprises:
   two mutually opposite free edges which originate from a fold at which said first wall is connected to a remaining portion of said substantially flat element;
   at least one of said easy tear-off lines extending across said free edges,
     said gluing means and said fold lying on opposite sides with respect to said at least one of said easy tear-off lines.

20. A package according to claim 4, wherein at least one of said first walls comprises:
   two mutually opposite free edges which originate from a fold at which said first wall is connected to a remaining portion of said substantially flat element;
   at least one of said easy tear-off lines extending across said free edges,
     said gluing means and said fold lying on opposite sides with respect to said at least one of said easy tear-off lines.

* * * * *